(12) United States Patent
Reid

(10) Patent No.: US 9,181,107 B2
(45) Date of Patent: Nov. 10, 2015

(54) DISSOLVED AIR FLOTATION AND EQUALIZATION REACTOR WASTEWATER TREATMENT TANK

(76) Inventor: John H. Reid, Fredericksburg, VA (US)

(*) Notice: Subject to any disclaimer, the term of this patent is extended or adjusted under 35 U.S.C. 154(b) by 669 days.

(21) Appl. No.: 13/437,105

(22) Filed: Apr. 2, 2012

(65) Prior Publication Data

US 2013/0256221 A1 Oct. 3, 2013

(51) Int. Cl.
  *C02F 1/24* (2006.01)
  *C02F 3/12* (2006.01)
  *C02F 103/32* (2006.01)

(52) U.S. Cl.
  CPC ............... *C02F 1/24* (2013.01); *C02F 3/1278* (2013.01); *C02F 2103/32* (2013.01); *C02F 2209/003* (2013.01); *C02F 2209/08* (2013.01); *C02F 2209/14* (2013.01); *C02F 2209/15* (2013.01); *C02F 2209/16* (2013.01); *C02F 2209/40* (2013.01); *Y02W 10/15* (2015.05); *Y10T 29/49826* (2015.01)

(58) Field of Classification Search
  CPC ....... C02F 1/24; C02F 2209/08; C02F 3/1278
  USPC ........ 210/221.1–221.2, 220, 532.1–533, 538, 210/540
  See application file for complete search history.

(56) References Cited

U.S. PATENT DOCUMENTS

| | | | | |
|---|---|---|---|---|
| 5,340,469 A | * | 8/1994 | Montgomery | 210/96.1 |
| 5,364,529 A | * | 11/1994 | Morin et al. | 210/608 |
| 5,997,735 A | * | 12/1999 | Gorton | 210/151 |
| 6,312,599 B1 | | 11/2001 | Reid | |
| 7,670,493 B2 | | 3/2010 | Bolam | |
| 7,922,907 B2 | | 4/2011 | Hassan et al. | |
| 7,967,985 B1 | | 6/2011 | Parjus et al. | |
| 2003/0015469 A1 | * | 1/2003 | Hedenland et al. | 210/620 |
| 2009/0025328 A1 | * | 1/2009 | Hemminger et al. | 52/514 |
| 2010/0078373 A1 | * | 4/2010 | Chaffee et al. | 210/226 |
| 2011/0089171 A1 | * | 4/2011 | Reilly et al. | 220/62.11 |
| 2011/0297552 A1 | | 12/2011 | Boyle et al. | |

* cited by examiner

*Primary Examiner* — Chester Barry
(74) *Attorney, Agent, or Firm* — Walter Ottesen P.A.

(57) ABSTRACT

Wastewater treatment tank for achieving hydraulic flow equalization and high efficiency soluble biological oxygen demand (BOD) removal. The wastewater treatment tank provides a compact arrangement of at least one dissolved air flotation (DAF) cell and an equalization reactor cell. The tank achieves regulatory wastewater pretreatment requirements for reducing total BOD concentrations below 250 to 300 mg/L.

22 Claims, 4 Drawing Sheets

US 9,181,107 B2

DISSOLVED AIR FLOTATION AND EQUALIZATION REACTOR WASTEWATER TREATMENT TANK

FIELD OF THE DISCLOSURE

A dissolved air flotation and equalization reactor wastewater treatment tank for treatment of food processing and other industrial or residential wastewater that contains significant amounts of colloidal and soluble pollutants that must be removed to obtain a required wastewater pretreatment system effluent quality.

BACKGROUND

Existing dissolved air flotation (DAF) wastewater treatment technology typically provides low efficiency removal of soluble biological oxygen demand (BOD) even when operated with high efficiency chemical coagulation and flocculation. In many situations of industrial wastewater pretreatment, a wastewater treatment facility operator is required to reduce BOD concentrations below 300 mg/L, and even below 250 mg/L, which cannot be consistently achieved without also achieving consistent partial soluble BOD removal. However, to obtain the required soluble BOD removal necessary to meet the total BOD pretreatment permit limit, some controlled level of biological treatment is also required to remove soluble BOD by converting soluble carbonaceous pollutants that cannot be removed by conventional DAF treatment operated with chemical coagulation and flocculation, into insoluble biomass solids that can be removed by chemical treatment and flotation in a DAF cell.

A conventional flow equalization basin which is used to provide hydraulic flow equalization upstream from a DAF cell cannot be effectively used to remove sufficient soluble BOD because the growth of biomass solids necessary to achieve consistent and adequate soluble BOD removal must be achieved by the recycle of solids skimmed from the downstream DAF. Because these DAF cell skimmings solids typically contain a high concentration of oil and grease (O&G) that is removed by flotation, these solids cannot be recycled back into the upstream flow equalization basin (FEB) without causing the buildup of excessive O&G in the FEB tank which would cause the DAF pretreatment process to fail. In addition, the high concentration of raw wastewater solids in the FEB influent wastewater makes it difficult to also develop an adequate concentration of biomass solids. The method of treatment typically used to avoid these O&G build ups, and, excessive influent solids loading problems in the FEB tank is to use a first stage DAF cell operated for O&G and total suspended solids (TSS) removal upstream from the FEB followed by a second stage DAF cell operated for BOD and TSS removal downstream from the FEB. Chemical treatment may be used in the first stage DAF cell to assist in O&G and solids removal upstream of the FEB tank.

The installation cost for such a two stage DAF pretreatment system with an intermediate FEB is typically prohibitive for many industries because two DAF cells and a large FEB tank are required to provide capability to consistently achieve the soluble and total BOD removal necessary to meet BOD pretreatment limits; and ammonia nitrogen, total Kjeldahl nitrogen (TKN), and total nitrogen removal to meet ammonia nitrogen, TKN, or total nitrogen pretreatment limits.

SUMMARY OF THE DISCLOSURE

Disclosed herein is a wastewater treatment system, comprising an equalization reactor cell and at least one dissolved air flotation cell, wherein the equalization reactor cell and the at least one dissolved air flotation cell are connected by a fluid connector located within the wastewater treatment system.

The wastewater treatment system provides a more compact, more efficient, and more cost effective single or multiple stage dissolved air flotation (DAF) treatment system using a poured in place concrete, or precast concrete or prefabricated steel or stainless steel structure in which the one or more DAF cells are combined with an equalization reactor, in one common structure, to provide controlled, consistent soluble BOD removal and total BOD removal to comply with BOD pretreatment limits of 300 mg/L or less; and, optionally, controlled consistent ammonia nitrogen, TKN, and total nitrogen removal to comply with ammonia nitrogen, TKN, and total nitrogen pretreatment limits of 30 mg/L or less.

DESCRIPTION OF THE BEST AND VARIOUS EMBODIMENTS

Figure 1:
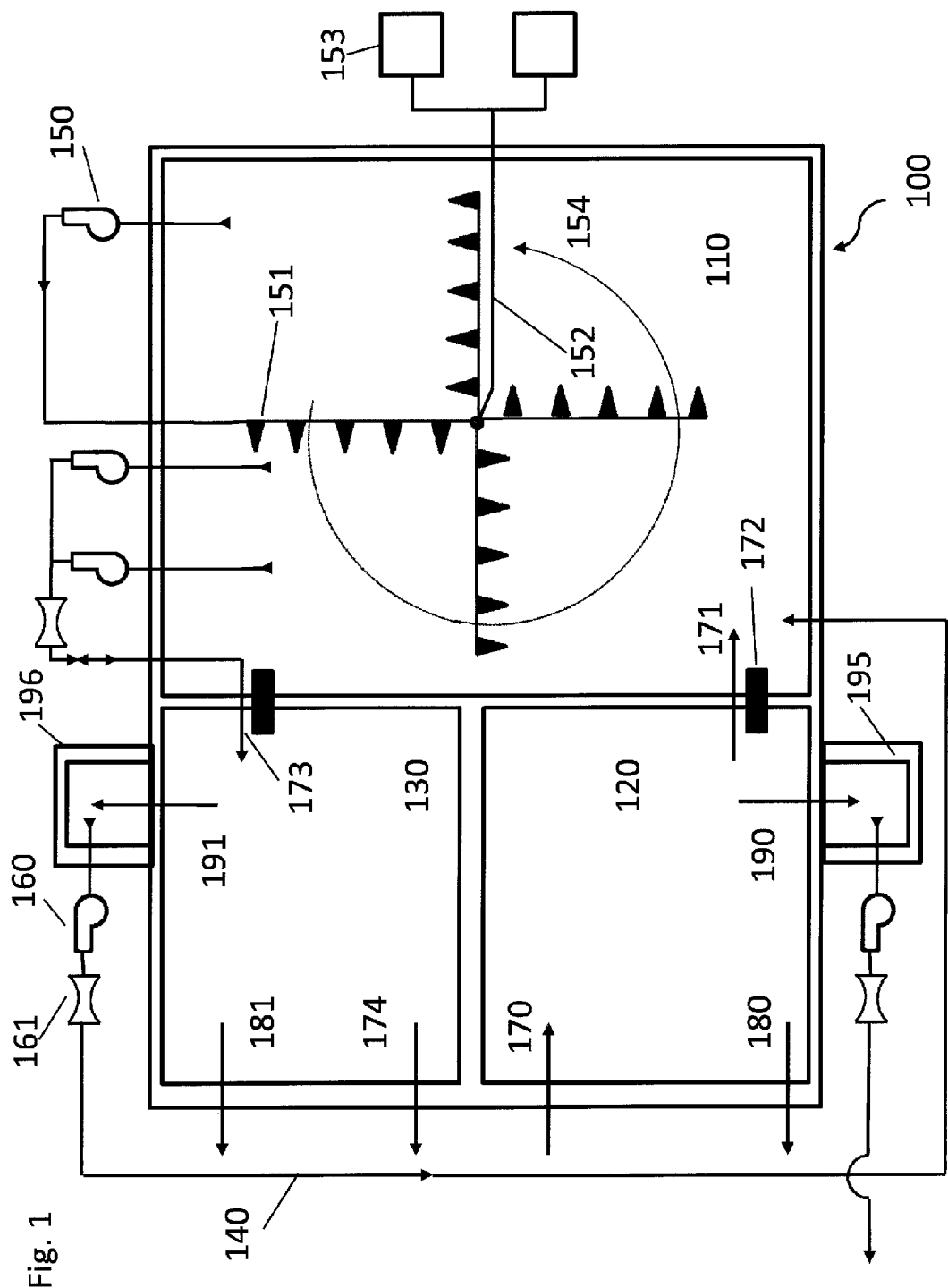
FIG. 1 shows an overhead view of a preferred embodiment of a wastewater treatment tank 100, which includes an equalization reactor cell 110 and two dissolved air flotation cells 120 and 130.

The foregoing and other objects, aspects, and advantages will be better understood from the following detailed description of the best and various embodiments. Throughout the various views and illustrative embodiments of the present disclosure, like reference numbers are used to designate like elements.

Disclosed herein is an improved dissolved air flotation (DAF) wastewater treatment system, which provides capability for achieving both hydraulic flow equalization and high efficiency soluble BOD removal, ammonia removal, TKN removal, and total nitrogen removal in a DAF pretreatment system used for treatment of food processing wastewater and other industrial wastewater that contains a significant soluble concentration that must be removed in order to obtain the required wastewater pretreatment system effluent quality.

This unique design for a DAF pretreatment system is commercially offered as the EquaCel™.

In a preferred embodiment, the wastewater treatment tank comprises two DAF cells. However, it is also possible to provide only one DAF cell or more than two DAF cells.

Typically, the wastewater treatment tank is provided with a bottom solids exit port for at least one dissolved air flotation cell. Further, the at least one dissolved air flotation cell preferably has a skimming exit port.

Also typically, the equalization reactor comprises a mixing device for mixing the wastewater. With preference, the mixing device is selected from the group consisting of a jet recirculation pump, a floating mixer, a submersible mixer pump, and a jet manifold aeration mixing header.

Preferably, the equalization reactor comprises an aeration device and/or mixing device for aerating wastewater in the equalization reactor cell. With preference, the aeration device is selected from the group consisting of a diffuser aerator, a diffuser aeration grid, and a jet aeration/mixing header. Accordingly, the jet aeration/mixing header can be employed to either aerate and mix the wastewater or to simultaneously aerate and mix the wastewater. However, even if only employed for mixing the wastewater, the jet aeration/mixing header ordinarily increases the dissolved oxygen concentration of the wastewater because air is introduced by the mixing.

Also preferably, the wastewater treatment tank comprises a positive displacement (PD) blower for introducing air into the wastewater. The PD blower is typically connected to the diffuser aerator, diffuser aeration grid, or jet aeration/mixing header.

With preference, the wastewater treatment tank further comprises a return activated sludge line. Typically, the return activated sludge line connects the second dissolved air flotation cell to the equalization reactor for conducting a second effluent flow from a downstream dissolved air flotation cell into the equalization reactor. Also typically, the return activated sludge line further comprises at least one of a flow meter and a pump.

With particularity, the wastewater treatment tank is made from concrete. In a preferred embodiment, the wastewater treatment tank is poured in place. In another preferred embodiment, the concrete for the wastewater treatment tank is precast.

In another preferred embodiment, the wastewater treatment tank is made from prefabricated steel. With particularity, the wastewater treatment tank is made from stainless steel.

Typically, the equalization reactor tank further comprises an effluent pump station. Also typically, an effluent intake port of the first dissolved air flotation cell and an effluent exit port of the second dissolved air flotation cell are provided on a same side wall of the wastewater treatment tank.

With particularity, the at least one DAF cell is provided upstream of the equalization reactor cell such that a first effluent flows from a first DAF cell into the equalization reactor cell through the fluid connector. If present, the second DAF cell is preferably provided downstream of the equalization reactor cell and a second effluent flow is pumped from the equalization reactor cell into a second dissolved air flotation cell through the fluid connector.

Further, disclosed herein is a method of providing a wastewater treatment system for treating wastewater, which comprises installing the wastewater treatment tank.

In a preferred method for treating wastewater an effluent exiting the final dissolved air flotation cell has a biological oxygen demand of 300 mg/L or less. In another preferred method for treating wastewater, an effluent exiting the final DAF cell has a total Kjeldahl nitrogen concentration or ammonia nitrogen concentration of 30 mg/L or less, and, optionally, a nitrite/nitrate nitrogen concentration of 30 mg/L or less.

FIG. 1 shows the operation and effluent flows of wastewater treatment system 100 comprising two dissolved air flotation cells 120 and 130. Wastewater flows or is pumped into the first DAF cell of the tank as influent 170. During this stage of the wastewater treatment process, suspended matter such as oil or solids, specifically oil and grease (O&G) are removed. In particular, air is dissolved in the wastewater and then released at atmospheric pressure. The released air forms tiny bubbles in the DAF cell, which adhere to the suspended matter causing the suspended matter to float to the surface of the water. Optionally, a coagulant or a combination of coagulant and flocculant chemicals, such as ferric chloride or aluminum sulfate or a polymer, may be added to the wastewater feed in the DAF cell tank to flocculate the suspended solids.

Skimming device 190 may then be used to remove the solids from the surface of the wastewater in the first DAF cell. Preferred skimming devices include, but are not limited to, belt, disk, drum, mop, tube and floating skimmers. Typically, the skimming device is dragged or pushed through or across the surface of the wastewater in the DAF cell whereby the floating solids attach to the skimming device. The solids are then removed as the skimmer is pulled through wiper blades or scrapers by a motorized drive system. The skimmed solids are collected in skimmings pit 195 and subsequently discharged.

Solids precipitating within the first DAF cell, typically in the form of sludge, can be removed from the tank using bottom solids exit port 180. The bottom solids may be removed by a flight and chain scrapper mechanism or auger mechanism using gravitational flow. However, the bottom solids may also be removed using a suction device, typically driven by a pump.

After having been at least partially pre-treated, wastewater is conducted from the first DAF cell 120 into the equalization reactor cell 110 through fluid connector 172 in the direction of arrow 171. Inflowing wastewater enters cell 110 at varying rates. The wastewater level within equalization reactor cell 110 oscillates between low water level mark 410 and high water level mark 420 shown in FIG. 4 to provide a buffer, such that wastewater leaving the equalization reactor cell 110 flows at a constant flow rate. Further, equalization reactor cell 110 may be operated as an anaerobic, anoxic, or aerobic reactor for performing activated sludge treatment and to remove a sufficient amount of biological oxygen demand (BOD), total nitrogen, and total phosphorous. Moreover, equalization reactor cell 110 preferably contains a mixing device to agitate the wastewater within equalization reactor cell 110, and an aeration device to transfer oxygen into the wastewater.

FIG. 1 depicts jet aeration/mixing header assembly 151. Wastewater within equalization reactor cell 110 is purged with air discharged by the jet aeration/mixing headers. The air for aeration is compressed by positive replacement pumps 153 and conducted to the jet aeration/mixing header assembly by connecting line 152. Jet recirculation pump 150 recirculates wastewater from equalization reactor cell 110 by pumping wastewater through jet aeration/mixing header assembly 151, where the wastewater is aerated with air provided by PD pumps 153. The thrust of the recirculated wastewater causes the jet aeration/mixing header assembly to rotate in the direction of circular arrow 154, which, as a result, mixes the wastewater.

Treated wastewater leaves equalization reactor cell 110 and flows or is pumped into the second DAF cell 130 through a fluid connector as influent 173. Air is dissolved anew, causing suspended matter still contained in the wastewater to float to the surface of the water. If desired, the wastewater may be chemically treated by adding a coagulant, which is typically an aluminum or an iron based inorganic compound or a polymer. Specifically, ferric chloride or aluminum sulfate may be used as inorganic compounds. Further, the polymer is typically a water-soluble organic polymer, which may be selected from, but is not limited to, polyamides and polyacrylamides.

Skimming device 191 may then be used to remove the solids from the surface of the wastewater in DAF cell 130 and collected in skimmings pit 196. Further, solids collected in skimmings pit 196 are partially or fully returned through return activated sludge line 140 into equalization reactor cell 110. Specifically, influent 171 is mixed with return activated sludge pumped through return activated sludge line 140 to form mixed liquor. The mixed liquor is aerated for a specified length of time. During the aeration the activated sludge organisms use the available organic matter as food producing stable solids and more organisms. The suspended solids produced during this stage and the additional organisms become part of the activated sludge.

Further, return activated sludge line 140 preferably comprises a flow meter 161 and valve 160. Treated wastewater exits the treatment tank as effluent 174.

Figure 2:
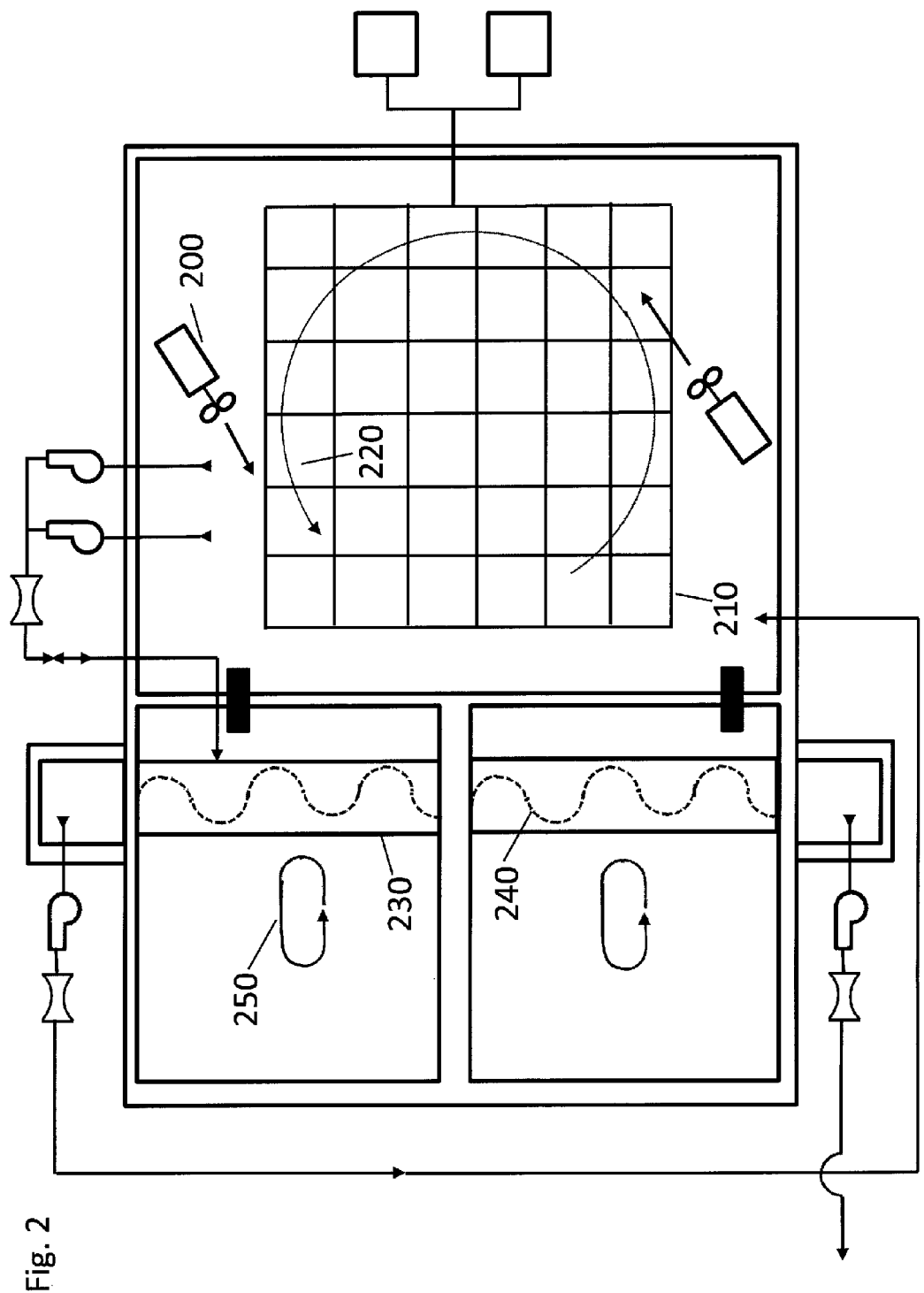
FIG. 2 shows another preferred embodiment of a wastewater treatment tank, which includes a diffuser grid 210 and two submersible pump mixers 200.
Figure 3:
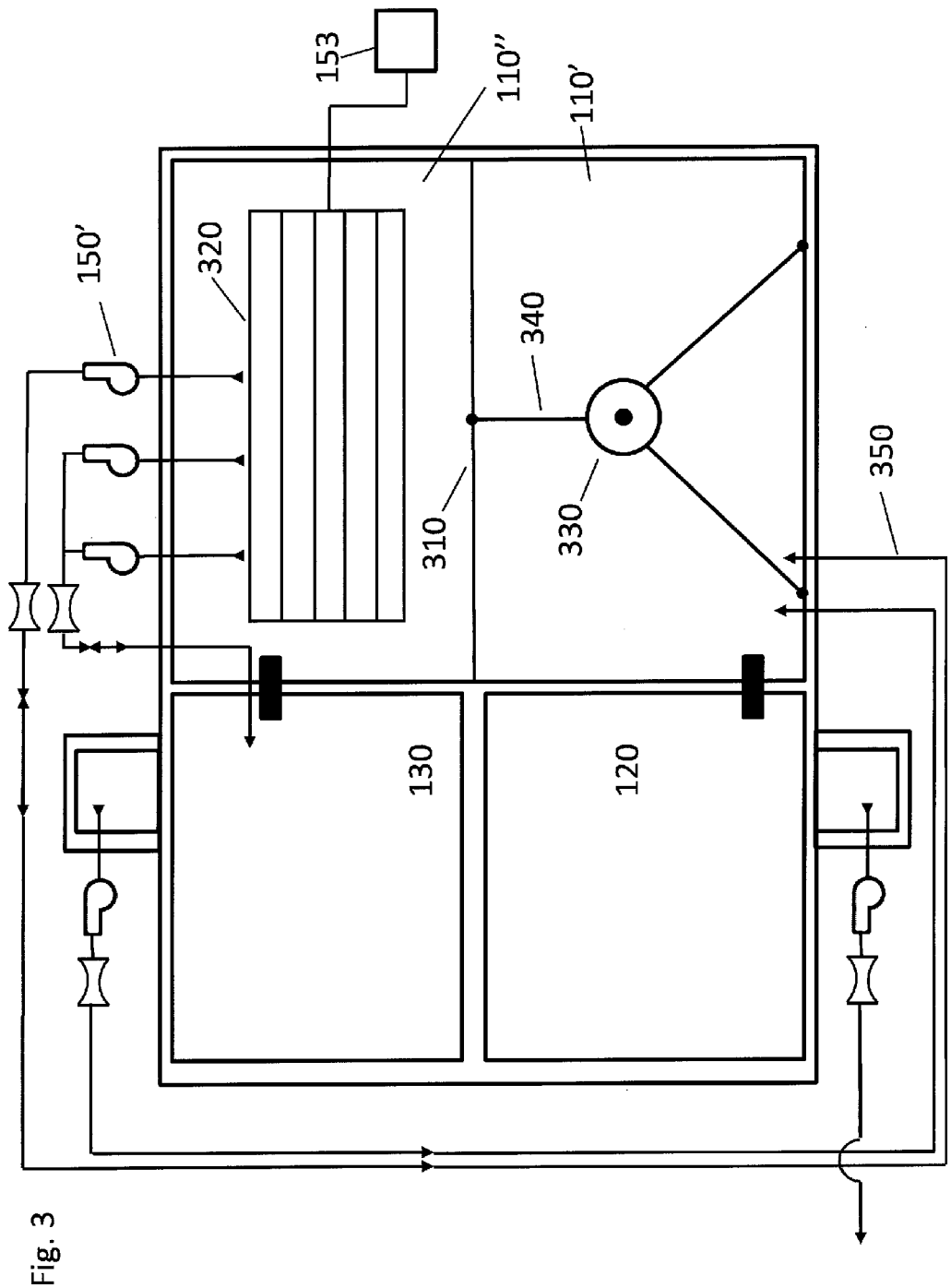
FIG. 3 shows yet another preferred embodiment of a wastewater treatment tank, which includes diffuser grids 310 and floating mixer 320.
Figure 4:
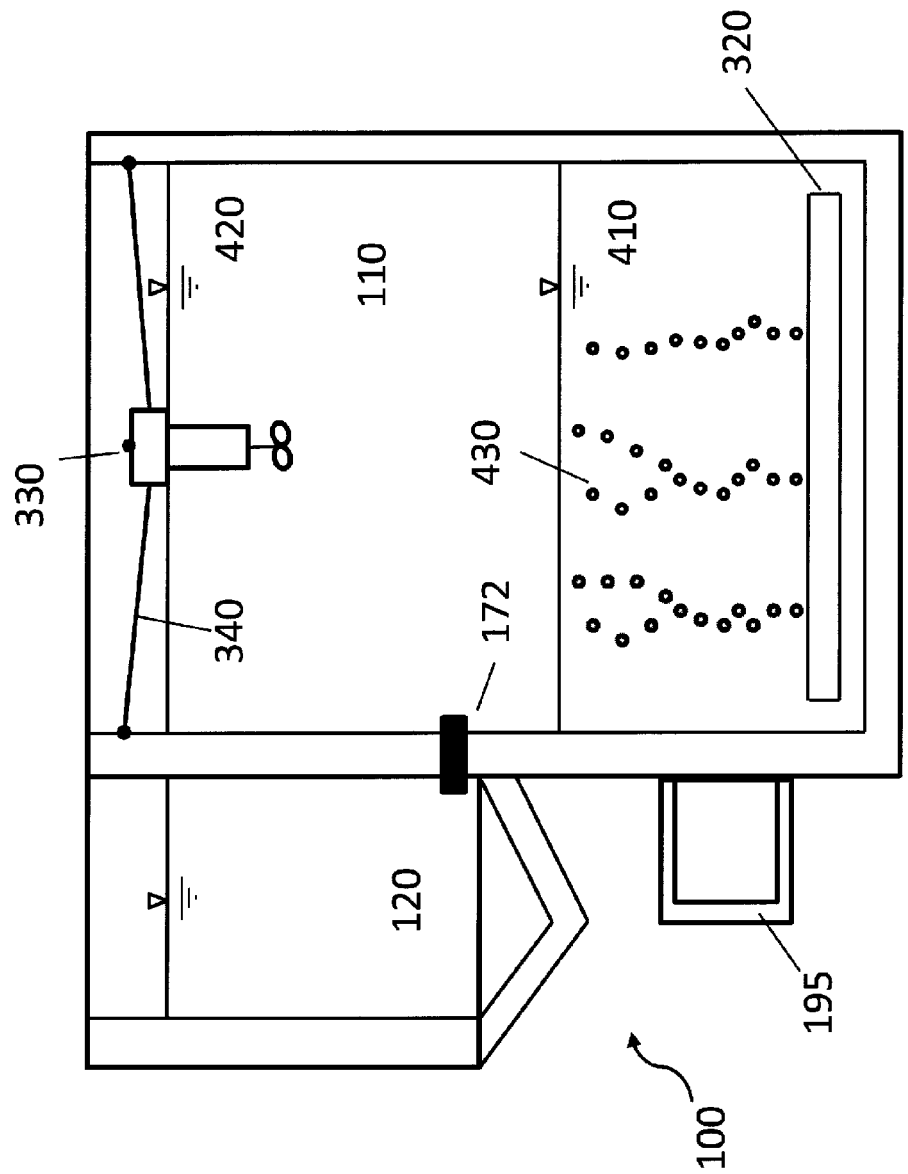
FIG. 4 shows a sideview of the wastewater treatment system of FIG. 3. The system contains wastewater at a level of from the low water level mark 410 to high water level mark 420.

The effluent flows of the embodiments depicted in FIGS. 2 to 4 are analogous to the effluent flows depicted above for the embodiment of FIG. 1. For clarity, the effluent flows have been omitted in FIGS. 2 to 4.

FIG. 2 depicts another preferred embodiment for aerating and mixing wastewater within equalization reactor cell 110. Specifically, two submersible pump mixers 200 are provided below the surface of the wastewater, which produce a mixing current for mixing the wastewater within the cell generally flowing in a path described by arrow 220. Depending on the size of the equalization reactor cell, a single or more than two submersible pump mixers can be used. It is also within the scope of the invention to provide several localized mixing currents or mixing currents following a path that is different from a circle. Further, the wastewater is aerated by air provided by diffuser aeration grid 210, which is located toward the bottom of the equalization reactor cell 110. Preferably, the submersible pump mixers are positioned such that the mixing current generated is provided above the diffuser aeration grid 210, such that air bubbles rising from the grid enter the mixing current.

FIG. 2 further depicts a preferred embodiment of a skimming device 190 or 191. In particular, a DAF cell is provided with a skimmer comprising skimming ramp 230 in which a collection trough with an auger 240 is located. Skimming ramp 230 is dragged across the surface of the wastewater in a reciprocal motion illustrated by arrow 250. Solids collected from the surface by the skimmer are collected in the skimming pits 190 or 191.

In FIG. 3, yet another preferred embodiment for aerating and mixing wastewater within equalization reactor cell 110 is depicted. The equalization reactor cell 110 is divided into two sections by divider wall 310, i.e., into a first section 110' and a second section 110". The first section 110' is operated as an anoxic equalization reactor and the second section 110" is operated as an aerobic equalization reactor. Wastewater can flow from the anoxic equalization reactor section into the aerobic equalization reactor section through flow holes in vicinity of the bottom of divider wall 310. A diffuser aerator 320 is provided toward the bottom of the aerobic equalization reactor cell section 110". However, it is also possible to provide two or more diffuser aerators. Floating mixer 330 is provided at the surface of the wastewater within the first equalization reactor section 110'. Further, the floating mixer 330 rises and falls with wastewater level within the equalization reactor cell. A plurality of cables 340, which are typically steel rope cables, fix the position of the floating mixer relative to the sidewalls of the equalization reactor cell, but allow floating mixer 330 to remain at the surface of the wastewater when the wastewater level rises or falls. In addition, a nitrate recycle line 350 is provided to return wastewater from the aerobic equalization reactor section into the anoxic equalization reactor section with the help of a pump, which is referred to as nitrate recycle pump 150'.

FIG. 4 depicts a sideview of the wastewater treatment tank of FIG. 3. Air bubbles 430 rise from diffuser aerator 320 toward the surface of the wastewater. For clarity, water bubbles are only depicted as reaching the wastewater surface at low level mark 410, but at least some air bubbles reach the actual wastewater level, which is at a level of from low level mark 410 to high level mark 420. While the air bubbles 430 rise to the surface, oxygen contained in the air is at least partially absorbed by the wastewater and is available for the wastewater treatment as dissolved oxygen (DO).

Preferably, DAF cells 120 and 130 are provided on the same side of the treatment tank to allow for streamlining the installation process of the treatment tank 100. Also with preference, the treatment tank may be inserted into an existing wastewater line by connecting the existing line to the intake port of influent 170 and diverting the flow through the tank. After treatment, the treated effluent may be transported through the existing wastewater line downstream of the inserted treatment tank 100.

The installation of the wastewater treatment tank described herein provides a more compact, more efficient, and more cost effective single or multiple stage wastewater treatment system that provides the capability to achieve both hydraulic flow equalization and high efficiency soluble BOD removal, TKN removal, and total nitrogen removal for industrial pretreatment. Use of the wastewater treatment tank reduces capital cost, land/building requirements, energy consumption and results in the production of a quality system effluent. Further, operation of the one or more DAF cells in combination with an equalization basin reactor, in one common structure, provides for a controlled and consistent soluble BOD, total BOD removal, TKN removal, and total nitrogen removal. In addition, operation of the wastewater treatment tank allows to achieve regulatory nitrogen removal requirements, as measured by TKN, ammonia nitrogen, nitrate nitrogen, and total nitrogen concentration.

The embodiments described hereinabove are further intended to explain best modes known of practicing the disclosure and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A wastewater treatment tank comprising:
    an equalization reactor cell; and,
    two dissolved air flotation cells, wherein the equalization reactor cell and the dissolved air flotation cells are connected by a fluid connector located within the wastewater treatment tank.

2. The wastewater treatment tank according to claim 1, wherein at least one dissolved air flotation cell has a bottom solids exit port.

3. The wastewater treatment tank according to claim 1, wherein at least one dissolved air flotation cell has a skimming exit port.

4. The wastewater treatment tank according to claim 1, further comprising a mixing device for mixing wastewater in the equalization reactor cell.

5. The wastewater treatment tank according to claim 4, wherein the mixing device is selected from the group consisting of a jet recirculation pump, a floating mixer, a submersible pump, and a jet aeration/mixing header.

6. The wastewater treatment tank according to claim 1, further comprising an aeration device for aerating wastewater in the equalization reactor cell.

7. The wastewater treatment tank according to claim 6, wherein the aeration device is selected from the group consisting of a diffuser aerator, a diffuser aeration grid and the jet aeration/mixing header.

8. The wastewater treatment tank according to claim 1, further comprising a positive displacement blower.

9. The wastewater treatment tank according to claim 1, further comprising a return activated sludge line for conducting a second effluent flow from a downstream dissolved air flotation cell into the equalization reactor.

10. The wastewater treatment tank of claim 9, wherein the return activated sludge line comprises at least one of a flow meter and a pump.

11. The wastewater treatment tank according to claim 9, wherein the return activated sludge line connects the second dissolved air flotation cell to the equalization reactor.

12. The wastewater treatment tank according to claim 1, wherein the wastewater treatment tank is made from concrete.

13. The wastewater treatment tank according to claim 12, wherein the wastewater treatment tank is poured in place.

14. The wastewater treatment tank according to claim 12, wherein the concrete is precast.

15. The wastewater treatment tank according to claim 1, wherein the wastewater treatment tank is made from prefabricated steel.

16. The wastewater treatment tank according to claim 1, wherein the wastewater treatment tank is made from stainless steel.

17. The wastewater treatment tank according to claim 1, wherein the equalization reactor cell further comprises an effluent pump station.

18. The wastewater treatment tank according to claim 1, wherein an effluent intake port of the first dissolved air flotation cell and an effluent exit port of the second dissolved air flotation cell are provided on a same side wall of the wastewater treatment tank.

19. The wastewater treatment tank according to claim 1, wherein the first dissolved air flotation cell is provided upstream of the equalization reactor cell and the second dissolved air flotation cell is provided downstream of the equalization reactor cell.

20. A method of providing a wastewater treatment system, comprising installing the wastewater treatment tank according claim 1.

21. A method for treating wastewater, comprising conducting wastewater into the wastewater treatment tank according to claim 1, wherein an effluent exiting a second dissolved air flotation cell has a biological oxygen demand of 300 mg/L or less.

22. A method for treating wastewater, comprising conducting wastewater into the wastewater treatment tank according to claim 1, wherein an effluent exiting a second dissolved air flotation cell has a total Kjeldahl nitrogen (TKN) concentration or ammonia nitrogen concentration of 30 mg/L or less, and, optionally, a nitrite/nitrate concentration of 30 mg/L or less.

* * * * *